(12) United States Patent
Griesbach (10) Patent No.: US 6,256,172 B1
(45) Date of Patent: Jul. 3, 2001

(54) ACTIVE CROSSTALK ATTENUATION CONDUCTOR FOR AN INTEGRATED LEAD HEAD SUSPENSION

(75) Inventor: Jason S. Griesbach, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 09/333,643

(22) Filed: Jun. 15, 1999

(51) Int. Cl.[7] ....................................... G11F 5/02
(52) U.S. Cl. ............................................. 360/246
(58) Field of Search ............................ 360/264.5, 274, 360/294, 294.1–294.6, 246

(56) References Cited

U.S. PATENT DOCUMENTS 5,862,010 * 1/1999 Simmons et al. ................. 360/97.01
6,088,235   7/2000 Chiao et al. ....................... 361/777

* cited by examiner

Primary Examiner—Robert S. Tupper
(74) Attorney, Agent, or Firm—Faegre & Benson LLP (57) ABSTRACT

A head suspension having an active crosstalk attenuation conductor is formed on a load beam for conducting a crosstalk attenuation signal in order to reduce crosstalk interference between first and second conductors on the load beam. Preferably, the active crosstalk attenuation conductor is located in between the first and second conductors along a portion of the load beam and the crosstalk attenuation signal is a function of the first signal so that the electromagnetic field generated by the active crosstalk attenuation conductor reduces or cancels, at the second conductor, the electromagnetic field generated by the first conductor.

20 Claims, 5 Drawing Sheets

ACTIVE CROSSTALK ATTENUATION CONDUCTOR FOR AN INTEGRATED LEAD HEAD SUSPENSION

TECHNICAL FILED

The present invention relates generally to suspensions for supporting read/write heads over recording media. In particular, the present invention is an integrated lead head suspension having an active crosstalk attenuation conductor for reducing crosstalk interference between conductors formed on the integrated lead head suspension.

BACKGROUND OF THE INVENTION

Disk drives include disk drive suspensions for supporting read/write heads over information tracks of rotating disks. The well-known and widely used Watrous-type suspensions include a load beam having a mounting region on a proximal end, a flexure on a distal end, a relatively rigid region adjacent to the flexure and a spring region between the mounting region and the rigid region. An air-bearing slider that includes a read/write head is mounted to the flexure. The mounting region is typically attached to a base plate for mounting the load beam to an actuator arm. A motor which is controlled by a servo control system rotates the actuator arm to position the read/write head over desired information tracks on the disk. This type of suspension is used with both magnetic and non-magnetic disks.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. The use of head suspensions having microactuators or fine tracking motors has been proposed to overcome these problems. Such suspensions are disclosed in U.S. Pat. Nos. 5,657,188 and 5,898,544, which are assigned to Hutchinson Technology Incorporated, the assignee of the present application, and which are incorporated by reference herein.

However, the signals that are used to control the microactuators are relatively large (for example, having a peak voltage of about 30 V) compared to the sensitive signals (typically in the millivolt range) coming from the head slider. Since the microactuator control conductors (which conduct microactuator control signals between microactuator control circuitry and the microactuator) and the head slider conductors (which conduct the head slider signals) are typically routed near each other along at least a portion of the load beam, the larger microactuator control signals will tend to capacitively couple into the head slider signals. This crosstalk interference will tend to corrupt the sensitive head slider signals.

One known approach to reducing crosstalk interference between two signal-carrying conductors formed on a substrate that is used in a wide range of electrical applications is to form a conventional passive guard trace (sometimes referred to herein as a "passive crosstalk attenuation conductor") in between the two signal-carrying conductors. The conventional passive crosstalk attenuation conductor is a conductor which is grounded, unterminated, or match terminated at its ends and runs between the two signal-carrying conductors. The conventional passive crosstalk attenuation conductor reduces the coupling between the two signal-carrying conductors, which reduces crosstalk interference therebetween.

Although conventional passive crosstalk attenuation conductors can reduce crosstalk interference to levels that are acceptable for some applications, conventional passive crosstalk attenuation conductors may not reduce crosstalk interference to acceptable level in other applications, such as when used on head suspensions having microactuator control conductors and head slider conductors. Thus, there is a continuing need for greater reductions in crosstalk interference between microactuator control conductors and head slider conductors.

SUMMARY OF THE INVENTION

The present invention can be embodied in any head suspension having first and second conductors conducting first and second signals, respectively. The head suspension according to the present invention includes an active crosstalk attenuation conductor formed on a load beam for conducting a crosstalk attenuation signal in order to reduce crosstalk interference between the first and second conductors. The crosstalk attenuation signal is a function of the first signal so that the electromagnetic field generated by the active crosstalk attenuation conductor reduces or cancels, at the second conductor, the electromagnetic field generated by the first conductor.

One embodiment of a head suspension according to the present invention includes a load beam having a distal end configured for receiving and supporting a head slider. A microactuator control conductor is located on the load beam for conducting a microactuator control signal between microactuator control circuitry and a microactuator mounted on the load beam. Also, a head slider conductor is located on the load beam for conducting a head slider signal between the head slider circuitry and the head slider. An active crosstalk attenuation conductor is positioned on the load beam for conducting a crosstalk attenuation signal to reduce crosstalk interference between the microactuator control conductor and the head slider conductor. Preferably the crosstalk attenuation conductor is located in between the microactuator control conductor and the head slider conductor along a portion of the load beam.

DETAILED DESCRIPTION OF THE INVENTION

Figure 1:
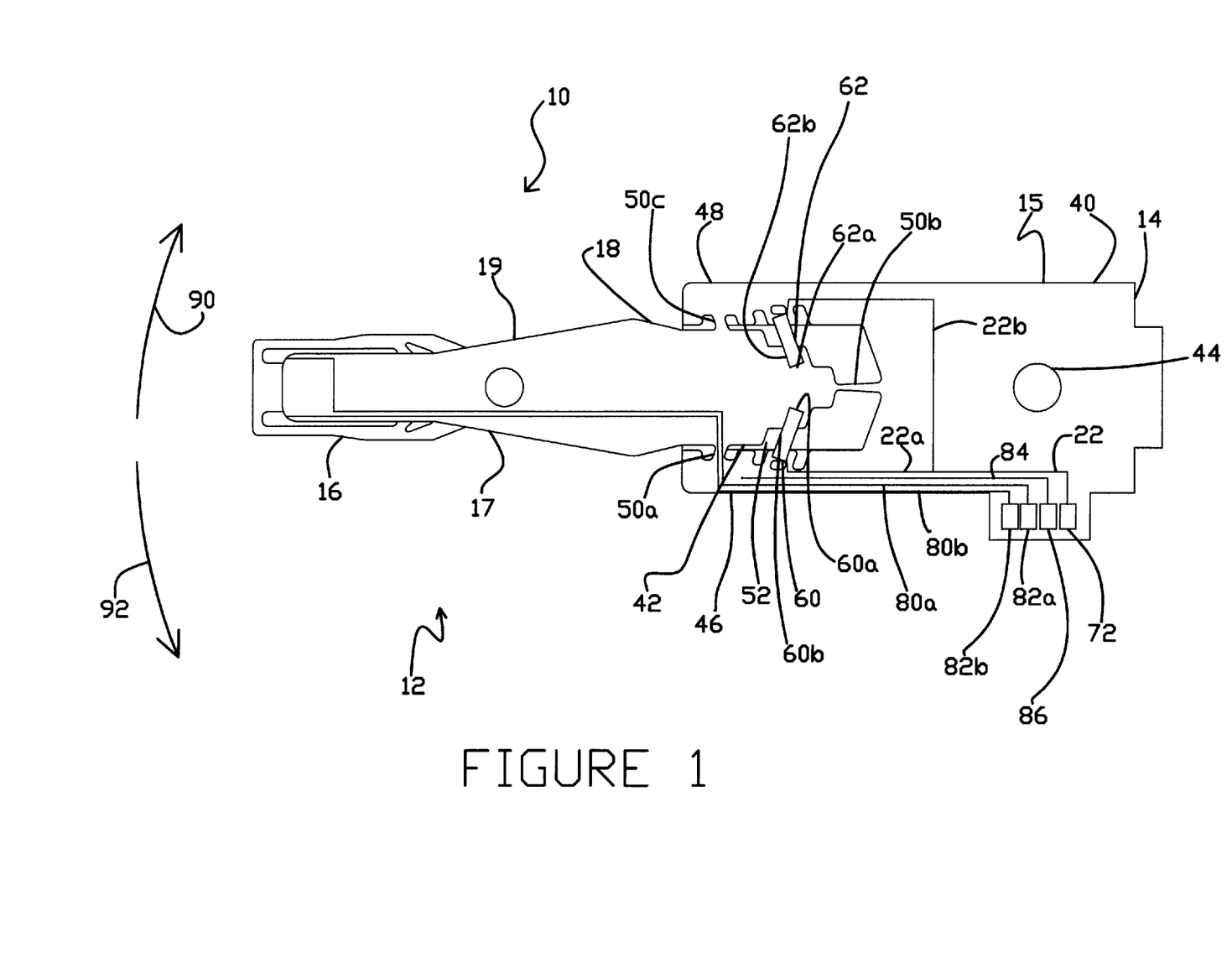
FIG. 1 is a top view of a head suspension having an active crosstalk attenuation conductor according to the present invention.
Figure 2:
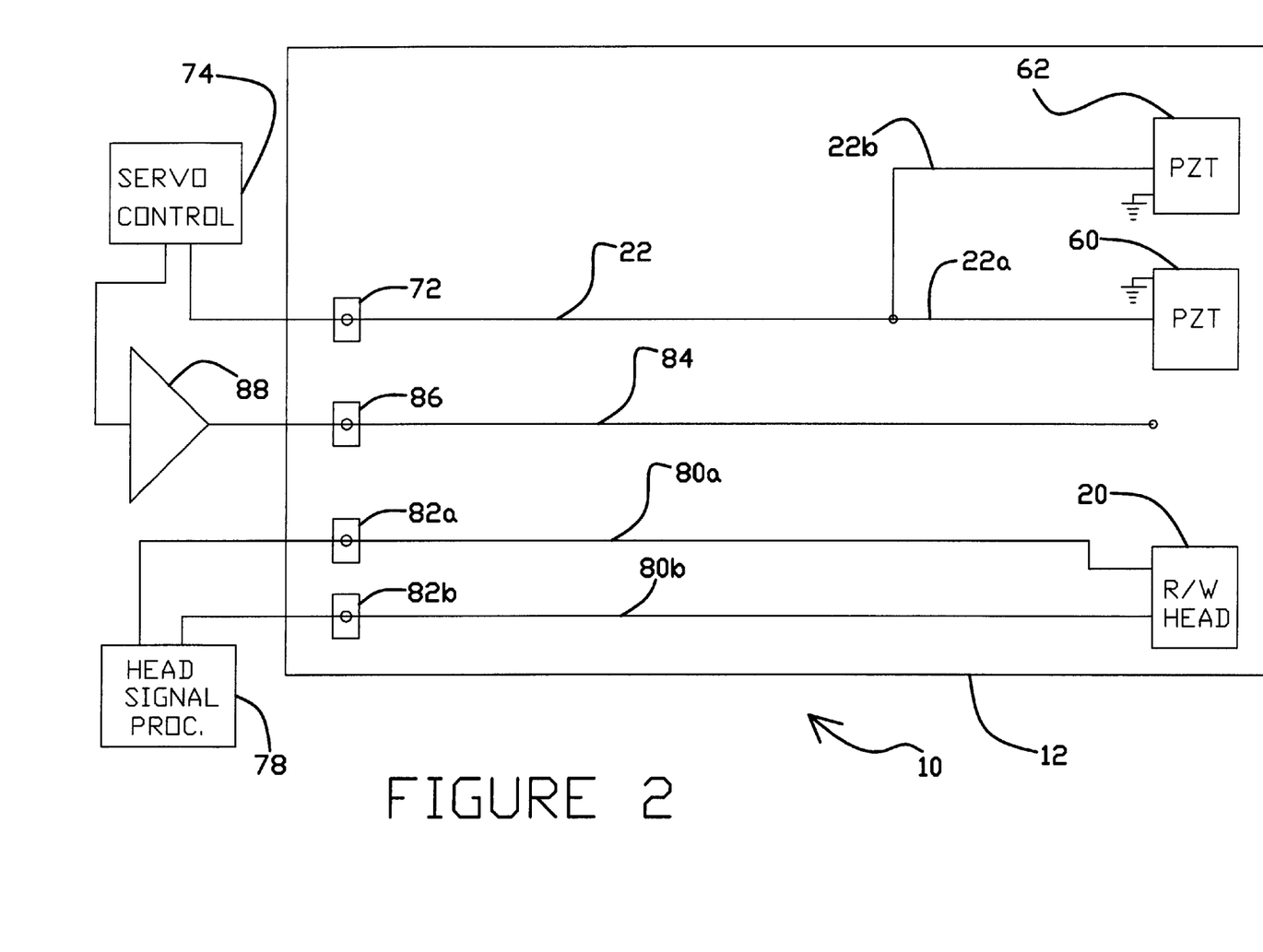
FIG. 2 is a schematic diagram of the head suspension of FIG. 1 electrically connected to servo control system, a crosstalk attenuation signal source, and head slider signal processing circuitry.

In the embodiment of the present invention shown in FIGS. 1–2, an active crosstalk attenuation conductor is used to reduce crosstalk interference between microactuator control conductors and head slider conductors. As shown, a head suspension 10 includes a load beam 12 having an extended base or mounting region 14 on a proximal end, a flexure 16 on a distal end, a relatively rigid region 17 adjacent to the flexure, and a radius or spring region 18 between the mounting region 14 and rigid region 17. Load beam 12 can be fabricated and formed from a sheet of stainless steel or other resilient material in a conventional manner.

A spring connection is provided between a head slider (not shown) and the distal end of load beam 12 by flexure 16, which permits the head slider to move in pitch and roll directions so that it can compensate for fluctuations of a spinning disk surface above which the slider "flies." Many different types of flexures, also known as gimbals, are known to provide the spring connection allowing for pitch and roll movement of the head slider and can be used with the present invention.

Head suspension 10 has a stationary section 15 and a moving section 19. In the embodiment of FIGS. 1–2, moving section 19 includes flexure 16, rigid region 17, spring region 18, and a moving portion 42 of mounting region 14. Stationary section 15 includes a stationary portion 40 of mounting region 14. Stationary portion 40 has a circular opening 44 to facilitate attachment of mounting region 14 to an actuator arm (not shown). Stationary portion 40 also has first longitudinally extending arm 46 and second longitudinally extending arm 48. Moving portion 42 of mounting region 14 is suspended between arms 46 and 48 by support beams 50a, 50b, and 50c to allow moving portion 42 to pivot with respect to stationary portion 40. A generally U-shaped gap 52 extends between stationary portion 40 and moving portion 42.

Head suspension 10 has two piezoelectric or electrostrictive elements 60 and 62 that serve as a microactuator mounted on load beam 12 to move flexure 16 and a read/write head 20 (shown schematically in FIG. 2) mounted thereto along either tracking axis 90 or 92. A first element 60 extends across gap 52 between first longitudinally extending arm 46 and moving portion 42 of mounting region 14. Element 60 is attached to arm 46 and moving portion 42 by adhesive or other known approaches. A microactuator control conductor 22 is attached to electrical contact 72 to connect, via branch 22a, the upper surface (that is, the surface not facing the load beam 12) of the element 60 to a servo control system 74 (shown in FIG. 2). The bottom surface (that is, the surface facing the load beam 12) of element 60 is grounded by connecting the bottom surface of element 60 to the load beam 12. A second element 62 extends across gap 52 between second longitudinally extending arm 48 and moving portion 42 of mounting region 14. Element 62 is attached to arm 48 and moving portion 42 by adhesive or other known approaches. A branch 22b of the microactuator control conductor 22 is attached to the upper surface of element 62 to connect the upper surface of element 62 to the servo control system 74. The bottom surface of element 62 is also grounded by connecting the bottom surface of element 62 to the load beam 12. Element 62 is mounted to the load beam 12 so that the polarity of element 62 is reversed with respect to element 60. For example, if, as shown in FIG. 1, element 60 is mounted to the load beam 12 so that the upper surface of element 60 is the positive pole of element 60, element 62 is mounted to the load beam 12 so that the upper surface of element 62 is the negative pole of element 62.

As shown in FIG. 1, elements 60 and 62 are generally rectangular in shape. Element 60 has a short side 60a and a long side 60b and element 62 has a short side 62a and a long side 62b. Element 60 is configured to expand or contract along the long side 60b and element 62 is configured to contract or expand in a direction along the long side 62b in response to a voltage signal from the servo control system 74 that is applied to the upper surfaces of both elements 60 and 62 in order to develop a voltage across the upper surfaces of element 60 and 62 and ground. Because elements 60 and 62 are connected to the microactuator control conductor 22 and the load beam 12 (i.e., ground) with their polarities reversed with respect to one another, element 60, which has a positive pole on its upper surface, will expand when the voltage supplied by the microactuator control conductor 22 is increased, while the element 62, which has a negative pole on its upper surface, will contract. Likewise, element 60 will contract and element 62 will expand as the voltage supplied by the microactuator control conductor 22 is decreased.

Elements 60 and 62 can each be biased with a voltage so that when moving portion 19 is in an undeflected state, that is, flexure 16 is not moved along tracking axis 90 or 92, elements 60 and 62 are in positions approximately halfway between their fully expanded stated and fully contracted states. To move flexure 16 along tracking axis 90, the voltage signal supplied by the microactuator control conductor 22 is increased so that element 60 expands and element 62 contracts. As element 60 expands, moving portion 42 of mounting region 14 is pushed away from arm 46 and as element 62 contracts, moving portion 42 is pulled towards arm 48 causing the moving section 19 of head suspension 10 to pivot about a point in moving portion 42. This motion causes flexure 16 and the read/write head 20 mounted thereto to move along tracking axis 90. Likewise, reducing the voltage signal supplied by the microactuator control conductor 22 causes element 60 to contract and element 62 to expand, which moves moving portion 19 and flexure 16 along tracking axis 92.

As noted above, elements 60 and 62 can be piezoelectric or electrostrictive. Piezoelectric elements can be fabricated from lead-zirconate-titanate and are commercially available from Newport Corporation of Irvine, Calif. Electrostrictive elements can be fabricated of lead-magnesium-niobate and are also commercially available from Newport Corporation of Irvine, Calif.

Conductive head slider conductors 80a and 80b are connected at distal end to the read/write head 20 (shown in FIG. 2) and at a proximal end to electrical contacts 82a and 82b, respectively. Circuitry 78 (shown in FIG. 2) for amplifying and processing the head slider signals carried on the head slider conductors 80a and 80b is connected to the electrical contacts 82a and 82b.

In the embodiment shown in FIGS. 1–2, the microactuator control conductor 22 is arranged parallel and adjacent to the head slider conductors 80a and 80b along a portion of the stationary portion 40. An active crosstalk attenuation conductor 84 is arranged on the stationary portion 40 between the microactuator control conductor 22 and the head slider conductors 80a and 80b. The active crosstalk attenuation conductor 84 has a proximal end connected to electrical contact 86 and a distal end that is unterminated (i.e., floating). A crosstalk attenuation signal source 88 (shown in FIG. 2) can be connected to the electrical contact 86 so that a crosstalk attenuation signal can be conducted on the active crosstalk attenuation conductor 84 in order to reduce the crosstalk interference between the microactuator control conductor 22 and the head slider conductors 80a and 80b. The crosstalk attenuation signal source 88 is designed to provide a crosstalk attenuation signal that will reduce the crosstalk interference between the microactuator control conductor 22 and the head slider conductors 80a and 80b. In the embodiment shown in FIGS. 1–2, the crosstalk attenuation signal source comprises an inverting amplifier that generates the crosstalk attenuation signal as a function of the microactuator control signal.

The active crosstalk attenuation conductor 84 is positioned on the load beam 12 in between the microactuator control conductor 22 and the head slider conductors 80a and 80b. For such an arrangement of the microactuator control conductor 22, the head slider conductors 80a and 80b, and the active crosstalk attenuation conductor 84, experiments have shown that inverting and reducing the amplitude of the microactuator control signal will produce a crosstalk attenuation signal that will reduce crosstalk interference between the microactuator control signals and head slider signals. Although the optimal amplitude of the crosstalk attenuation signal is heavily dependant on several factors including the particular geometry of the conductors that are used and the particular type of signals that are being conducted, an amplitude of about ⅕ the amplitude of the microactuator control signal has been found to be effective for the geometries and signals described below in the Examples.

Head suspension 10 can be fabricated as an integrated lead type head suspension by etching a laminate having a spring layer (formed from stainless steel, for example), an insulator layer (formed from a polyimide or a other dielectric, for example), and a conductor layer (formed from a copper alloy, for example). One suitable method for fabricating an integrated lead type head suspension that can be used to fabricate a head suspension 10 according to the present invention is disclosed in U.S. Pat. No. 5,839,193, which is assigned to Hutchinson Technology Incorporated, the assignee of the present application, and which is incorporated by reference herein. Alternatively, head suspension 10 can be fabricated using other conventional fabrication techniques, for example, depositing or otherwise forming insulator and conductor features on a load beam.

EXAMPLES

Test coupons comprising a laminate structure of a stainless steel ground plane, a polyimide dielectric layer formed on top of the stainless steel ground plane, and a plurality of parallel conductors formed on top of the polyimide layer were fabricated. Three different types of test coupons were fabricated. Test coupon 110, shown in FIG. 3, models a conventional head suspension that does not have any kind of crosstalk attenuation features, test coupon 112, shown in FIG. 4, models a conventional head suspension having a conventional passive crosstalk attenuation conductor, and test coupon 114, shown in FIG. 5, models a head suspension having an active crosstalk attenuation conductor according to the present invention.

Figure 3:
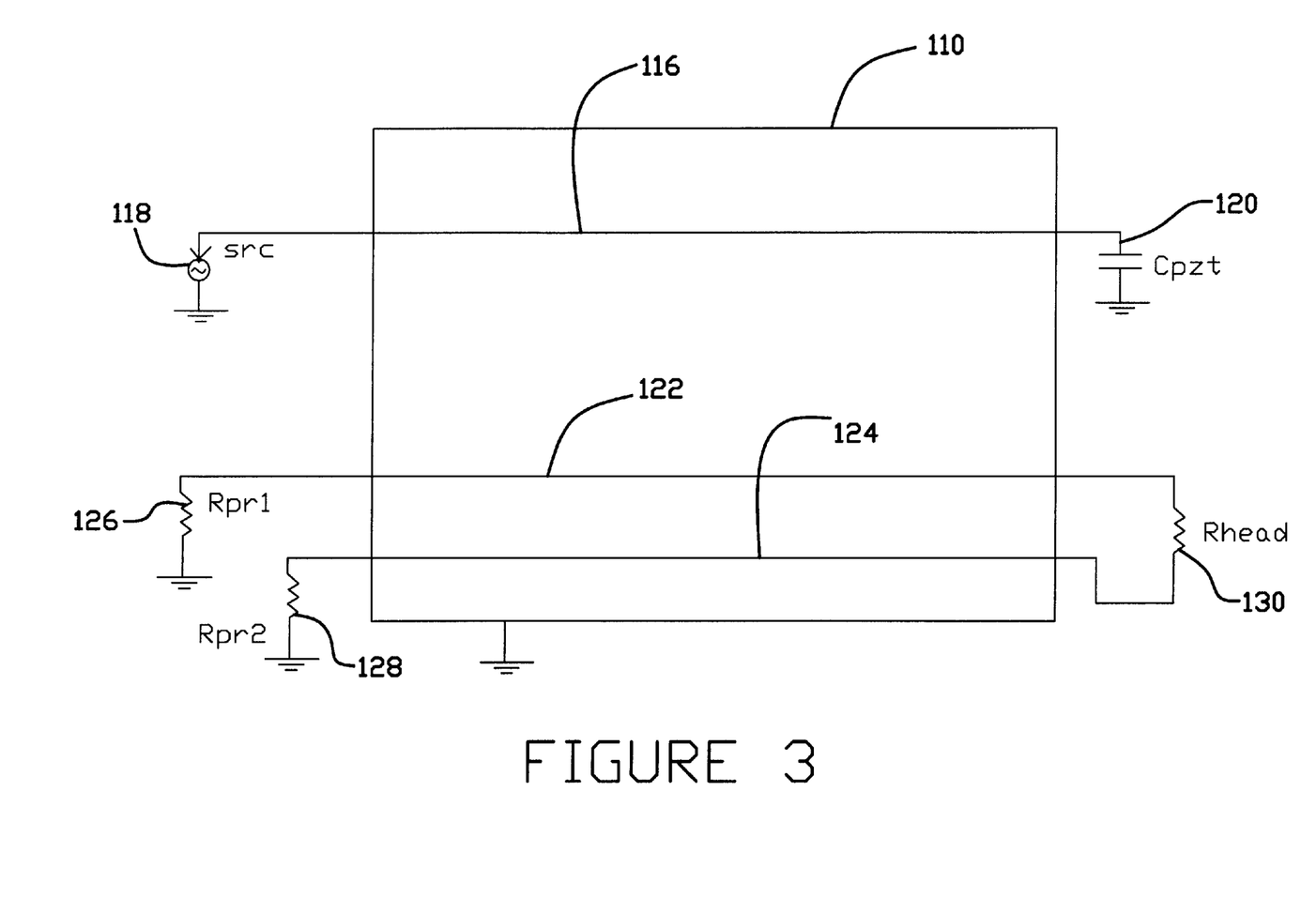
FIG. 3 is a schematic diagram of a test coupon having no crosstalk attenuation features.
Figure 4:
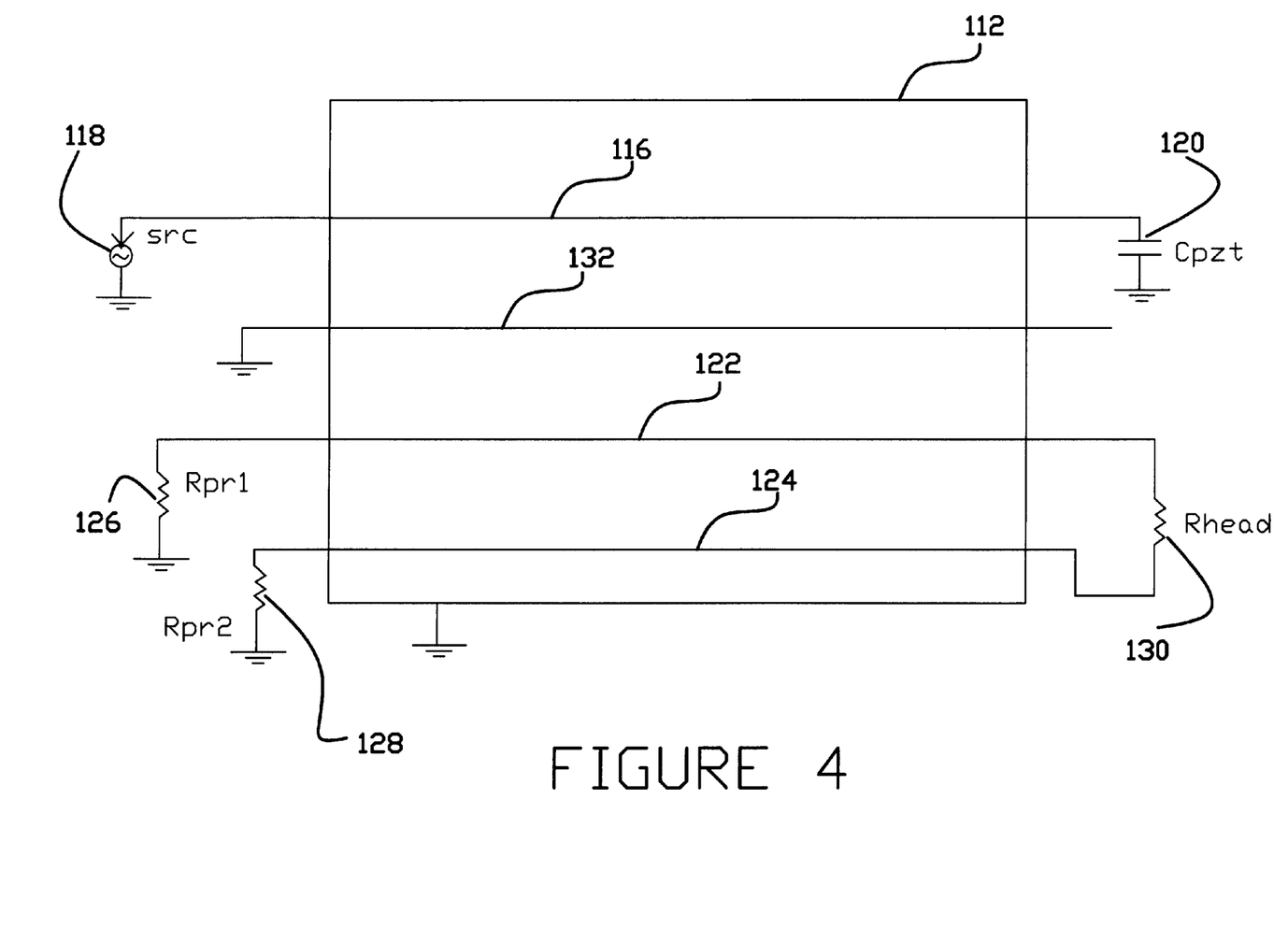
FIG. 4 is a schematic diagram of a test coupon having a conventional passive crosstalk attenuation conductor.
Figure 5:
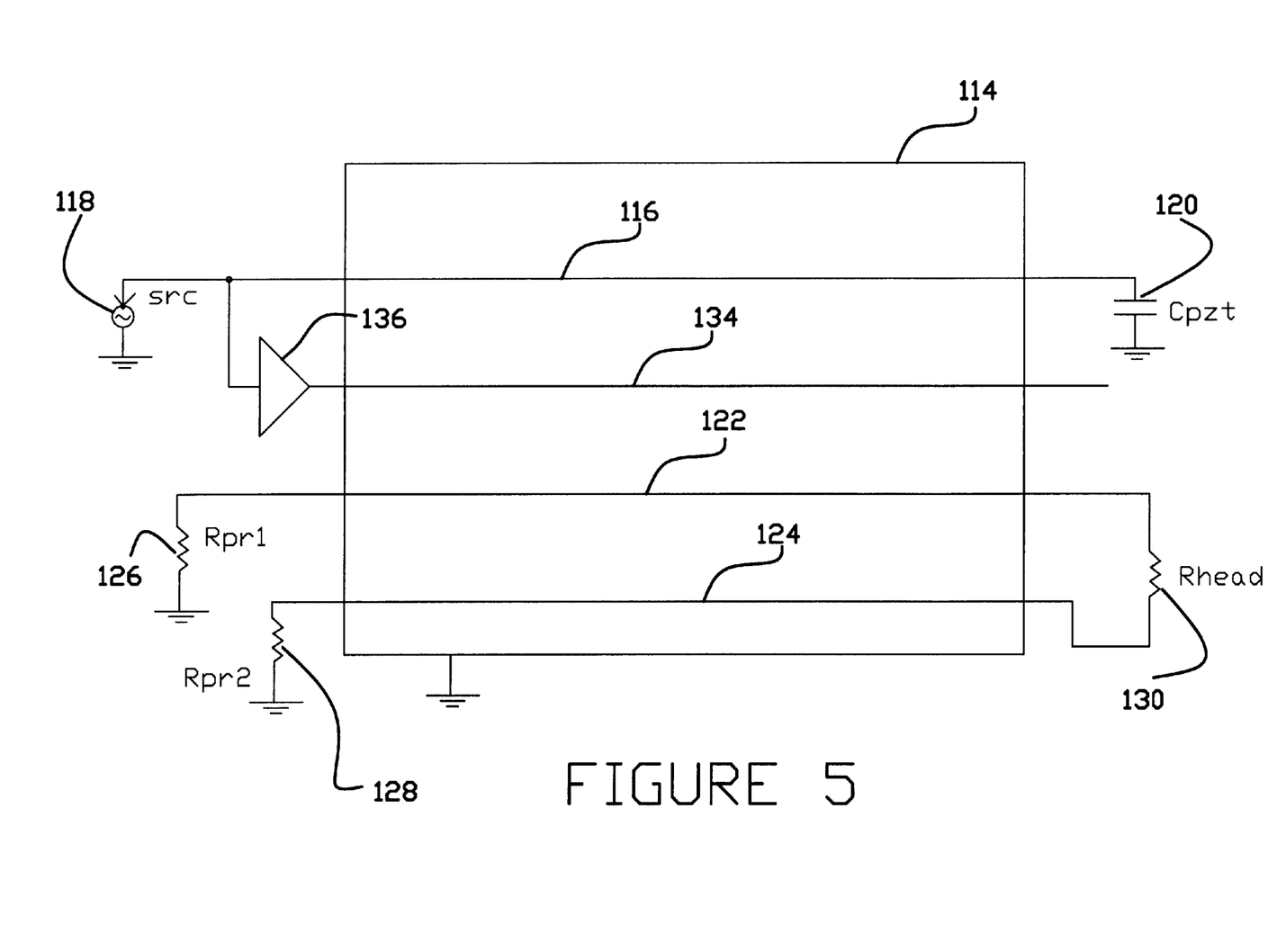
FIG. 5 is a schematic diagram of a test coupon having an active crosstalk attenuation conductor according to the present invention.

Each of the test coupons shown in FIGS. 3–5 have a first conductor 116 that models the microactuator control conductor 22 shown in FIGS. 1–2. Conductor 116 on each of the test coupons is connected to a voltage source 118 that generates a signal, which is representative of a microactuator control signal, in order to drive a piezoelectric capacitive load (Cpzt) 120 of 0.75 nanofarads, which models the piezoelectric microactuator shown in FIGS. 1–2. Each of the test coupons also has second and third conductors 122 and 124 that model the head slider conductors 80a and 80b shown in FIGS. 1–2. Conductors 122 and 124 are connected at their proximal ends to first and second resistive loads Rpr1 126 and Rpr2 128, respectively. A third resistive load Rhead 130 electrically connects the second and third conductors 122 and 124 at their distal ends and models the head slider 20 shown in FIGS. 1–2.

Test coupon 110, shown FIG. 3, was designed to include no additional features for reducing crosstalk interference; consequently, the first and second conductors 116 and 122 have no conductive elements formed therebetween. Test coupon 112 shown in FIG. 4 includes a fourth conductor 132 in between the first and second conductors 116 and 122. The fourth conductor 132 has a proximal end that is grounded and a distal end that is unterminated so as to model a conventional passive crosstalk attenuation conductor.

Test coupon 114 shown in FIG. 5 includes an active crosstalk attenuation conductor 134 in between the first and second conductors 116 and 122 and models the active crosstalk attenuation conductor 84 shown in FIGS. 1–2. A crosstalk attenuation signal is applied to the active crosstalk attenuation conductor 134 by an inverting amplifier 136 that is connected to the first conductor 116. The crosstalk attenuation signal is an inverted and reduced-amplitude version of the signal conducted on the first conductor 116.

In the experiments described below, a 30 Vpk, 10 KHz signal was applied to the first conductor 116 of each of the test coupons 110, 112, and 114 by the voltage source 118. The crosstalk attenuation signal applied to the active crosstalk attenuation conductor 134 of test coupon 116 had about ⅕ the amplitude of the signal provided by the voltage source 118. However, as noted above, the optimal amplitude of the crosstalk attenuation signal is heavily dependant on several factors including the particular geometry of the conductors that are used and the particular type of signals that are being conducted.

Example 1

A first set of test coupons 110, 112, and 114 were fabricated with the conductors spaced 40 micrometers apart. Each test coupon was tested with Rhead 130, Rpr1 126, and Rpr2 128 open (the results of which are provided in TABLE 1 under the subheading "op-op"), with Rhead 130 set to 50 Ohms and Rpr1 126 and Rpr2 128 open (the results of which are provided in TABLE 1 under the subheading "50-op"), and with Rhead set to 50 Ohms and Rpr1 126 and Rpr2 128 set to 1 kiloohm (the results of which are provided in TABLE 1 under the subheading "50-1 k"). The signal levels on the second and third conductors 122 and 124 were measured and are shown in TABLE 1 in the columns labeled V2 and V3, respectively. Also, an oscilloscope was used to mathematically subtract the signals on the second and third conductors 122 and 124 to determine the voltage difference across the second and third conductors 122 and 124, which is the voltage typically used by the head slider signal processing circuitry 78. The amplitude of this mathematical waveform is shown in TABLE 1 in the column labeled Vdif.

TABLE 1

40 micrometer Spacing
(all values are in mV peak)

|  | V2 | V3 | V-dif |
|---|---|---|---|
| Op-op |  |  |  |
| Test Coupon 110 | 212 | 20.7 | 191 |
| Test Coupon 112 | 16.75 | 9.5 | 7.3 |
| Test Coupon 114 | 8 | 8.75 | 0.75 |
| 50-op |  |  |  |
| Test Coupon 110 | 115.5 | 115 | 1.5 |
| Test Coupon 112 | 13.1 | 13.05 | 0.15 |
| Test Coupon 114 | 1.1 | 1.1 | 0.06 |

TABLE 1-continued 40 micrometer Spacing
(all values are in mV peak)

| | V2 | V3 | V-dif |
|---|---|---|---|
| 50-1k | | | |
| Test Coupon 110 | 0.75 | 0.72 | 0.07 |
| Test Coupon 112 | 0.17 | 0.18 | 0.05 |
| Test Coupon 114 | 0.13 | 0.13 | 0.05 |

Example 2

A second set of test coupons 110, 112, and 114 were fabricated with the conductors spaced 70 micrometers apart. The test coupons were tested in the same way as with Example 1 and the results are shown in TABLE 2.

TABLE 2

70 micrometer Spacing
(all values are in mV peak)

| | V2 | V3 | V-dif |
|---|---|---|---|
| Op-op | | | |
| Test Coupon 110 | 86 | 16.3 | 69.6 |
| Test Coupon 112 | 14.25 | 7.95 | 6.3 |
| Test Coupon 114 | 6.8 | 6.95 | 1.4 |
| 50-op | | | |
| Test Coupon 110 | 50.9 | 50.5 | 0.59 |
| Test Coupon 112 | 11.1 | 11.05 | 0.14 |
| Test Coupon 114 | 0.95 | 0.95 | 0.05 |
| 50-1k | | | |
| Test Coupon 110 | 0.37 | 0.36 | 0.05 |
| Test Coupon 112 | 0.17 | 0.17 | 0.05 |
| Test Coupon 114 | 0.13 | 0.13 | 0.05 |

Example 3

A third set of test coupons 110, 112, and 114 were fabricated with the conductors spaced 100 micrometers apart. The test coupons were tested in the same way as with Example 1 and the results are shown in TABLE

TABLE 3

100 micrometer Spacing
(all values are in mV peak)

| | V2 | V3 | V-dif |
|---|---|---|---|
| Op-op | | | |
| Test Coupon 110 | 53.4 | 14.4 | 39.1 |
| Test Coupon 112 | 11.6 | 6.85 | 4.8 |
| Test Coupon 114 | 5.85 | 5.75 | 0.44 |
| 50-op | | | |
| Test Coupon 110 | 33.9 | 33.7 | 0.28 |
| Test Coupon 112 | 9.25 | 9.2 | 0.15 |
| Test Coupon 114 | 0.84 | 0.82 | 0.06 |
| 50-1k | | | |
| Test Coupon 110 | 0.26 | 0.26 | 0.05 |
| Test Coupon 112 | 0.14 | 0.15 | 0.05 |
| Test Coupon 114 | 0.13 | 0.13 | 0.05 |

The results from these three Examples show that excessive crosstalk interference levels are present when no crosstalk attenuation features are used. The results also show that although use of a conventional passive crosstalk attenuation conductor reduces crosstalk interference dramatically, use of an active crosstalk attenuation conductor according to the present invention reduces crosstalk interference by an order of magnitude more than the conventional passive crosstalk attenuation conductor.

Although the present invention has been described with reference to a preferred embodiment, those skilled in the art will recognize that changes can be made in form and detail without departing from the spirit and scope of the invention. For example, although the present invention has been described as being used to reduce crosstalk interference between microactuator control conductors and head slider conductors, it is to be understood that the present invention may also be useful in reducing crosstalk interference between other conductors formed on a head suspension.

What is claimed is:

1. A head suspension assembly having a crosstalk attenuator, comprising:
    a load beam;
    a first conductor on the load beam for conducting a first signal;
    a second conductor on the load beam for conducting a second signal wherein the first signal is capable of inducing crosstalk interference in the second signal;
    a crosstalk attenuation signal source having an output providing a crosstalk attenuation signal; and
    an active crosstalk attenuation conductor on the load beam having a proximal end connected to the output of the crosstalk attenuation signal source for carrying the crosstalk attenuation signal to reduce crosstalk interference between the first and second conductors.

2. The head suspension assembly of claim 1, wherein the active crosstalk attenuation conductor is located in between the first conductor and the second conductor along a portion of the load beam.

3. The head suspension assembly of claim 1, wherein the active crosstalk attenuation conductor is unterminated at a distal end thereof.

4. The head suspension assembly of claim 1, wherein the active crosstalk attenuation conductor is terminated at a distal end thereof.

5. The head suspension assembly of claim 1, wherein the crosstalk attenuation signal source further comprises an input connected to the first conductor for receiving the first signal.

6. The head suspension assembly of claim 1, further comprising an active crosstalk attenuation terminal at the proximal end of the active crosstalk attenuation conductor for coupling the crosstalk attenuation signal to the active crosstalk attenuation conductor.

7. The bead suspension assembly of claim 6, wherein the crosstalk attenuation signal source is electrically connected to the active crosstalk attenuation terminal for providing the crosstalk attenuation signal to the active crosstalk attenuation conductor.

8. The head suspension assembly of claim 1, wherein the crosstalk attenuation signal source is electrically connected to the first conductor for providing the crosstalk attenuation signal as a function of the first signal.

9. The head suspension assembly of claim 1, wherein the crosstalk attenuation signal source includes an invertor for inverting the first signal in order to provide the crosstalk attenuation signal.

10. The head suspension assembly of claim 1, wherein the crosstalk attenuation signal source includes an amplifier for reducing the amplitude of the first signal to provide the crosstalk attenuation signal.

11. A head suspension assembly, comprising:
   a load beam having a distal end configured for receiving and supporting a head slider;
   a microactuator on the load beam;
   a microactuator control conductor on the load beam for conducting a microactuator control signal to the microactuator;
   a head slider conductor on the load beam for conducting a head slider signal to the head slider;
   a crosstalk attenuation signal source; and
   an active crosstalk attenuation conductor on the load beam electrically connected to the crosstalk attenuation signal source and carrying a crosstalk attenuation signal to reduce crosstalk interference between the microactuator control conductor and the head slider conductor.

12. The head suspension assembly of claim 11, wherein the active crosstalk attenuation conductor is located in between the microactuator control conductor and the head slider conductor along a portion of the load beam.

13. The head suspension assembly of claim 11, wherein the active crosstalk attenuation conductor is unterminated at a distal end thereof.

14. The head suspension assembly of claim 11, wherein the active crosstalk attenuation conductor is terminated at a distal end thereof.

15. The head suspension assembly of claim 11, wherein the crosstalk attenuation signal source further comprises an input connected to a control system for the microactuator.

16. The head suspension assembly of claim 11, further comprising an active crosstalk attenuation terminal at an end of the active crosstalk attenuation conductor for coupling the crosstalk attenuation signal to the active crosstalk attenuation conductor.

17. The head suspension assembly of claim 16, wherein the crosstalk attenuation signal source electrically connected to the active crosstalk attenuation terminal for providing the crosstalk attenuation signal.

18. The head suspension assembly of claim 11, wherein the crosstalk attenuation signal source is electrically connected to the microactuator control conductor and provides the crosstalk attenuation signal as a function of the microactuator control signal.

19. The head suspension assembly of claim 11, wherein the crosstalk attenuation signal source includes an invertor for inverting the microactuator control signal in order to provide the crosstalk attenuation signal.

20. The head suspension assembly of claim 11, wherein the crosstalk attenuation signal source includes an amplifier for reducing the amplitude of the microactuator control signal to provide the crosstalk attenuation signal.

* * * * *

UNITED STATES PATENT AND TRADEMARK OFFICE
CERTIFICATE OF CORRECTION

PATENT NO.    : 6,256,172 B1
DATED         : July 3, 2001
INVENTOR(S)   : Jason S. Griesbach It is certified that error appears in the above-identified patent and that said Letters Patent is hereby corrected as shown below:

Column 4,
Line 42, insert -- a -- before "distal"

Column 5,
Line 59, insert -- 60 -- after "microactuator"

Column 7,
Line 45, insert -- 3. -- after "TABLE"

Signed and Sealed this

Fifth Day of November, 2002

Attest:

JAMES E. ROGAN
Attesting Officer    Director of the United States Patent and Trademark Office